US006754896B2

(12) United States Patent
Mishra et al.

(10) Patent No.: US 6,754,896 B2
(45) Date of Patent: Jun. 22, 2004

(54) METHOD AND SYSTEM FOR ON-DEMAND INSTALLATION OF SOFTWARE IMPLEMENTATIONS

(75) Inventors: Debi P. Mishra, Redmond, WA (US); David E. Kays, Jr., Carnation, WA (US); Markus Horstmann, Redmond, WA (US); Mark H. Lucovsky, Redmond, WA (US); Shannon J. Chan, Bellevue, WA (US); Bharat A. Shah, Bellevue, WA (US); Gregory A. Jensenworth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/264,356

(22) Filed: Oct. 4, 2002

(65) Prior Publication Data

US 2003/0126592 A1 Jul. 3, 2003

Related U.S. Application Data

(63) Continuation of application No. 09/158,022, filed on Sep. 21, 1998, now Pat. No. 6,523,166.

(51) Int. Cl.[7] .............................................. G06F 9/445
(52) U.S. Cl. ...................................... 717/176; 709/224
(58) Field of Search ................................. 709/224, 220, 709/221, 217, 223, 225, 226; 717/170–173, 174–178; 713/200, 201, 202

(56) References Cited

U.S. PATENT DOCUMENTS 5,999,740 A * 12/1999 Rowley ...................... 717/173
6,009,274 A * 12/1999 Fletcher et al. ............. 717/173
6,094,531 A *  7/2000 Allison et al. .............. 717/176
6,167,567 A * 12/2000 Chiles et al. ............... 717/173
6,189,030 B1 *  2/2001 Kirsch et al. ............... 709/224
6,192,406 B1    2/2001 Ma et al.
6,202,207 B1 *  3/2001 Donohue .................... 717/173
6,219,786 B1    4/2001 Cunningham et al.
6,345,386 B1 *  2/2002 Delo et al. .................. 717/176
6,377,263 B1 *  4/2002 Falacara et al. ............ 345/473
6,418,554 B1 *  7/2002 Delo et al. .................. 717/174
6,523,166 B1 *  2/2003 Mishra et al. ............... 717/174

* cited by examiner

Primary Examiner—Mehmet B. Geckil
(74) Attorney, Agent, or Firm—Law Offices of Albert S. Michalik, PLLC

(57) ABSTRACT

A method and system for installing software implementations such as applications and COM classes as they are needed from an external source, such as a centralized network store. When a software implementation is needed, the system and method first look to the local system (e.g., registry) for that software implementation, and if found, returns the information such as a local path needed to use the software implementation. If the implementation is not found locally, the present invention dynamically looks to a centralized class store of a network, to locate the needed implementation. When located, the implementation is downloaded and locally installed in a manner that is essentially transparent to the user. Software implementations such as application products may be divided into features and components to improve on-demand installation thereof.

34 Claims, 9 Drawing Sheets

METHOD AND SYSTEM FOR ON-DEMAND INSTALLATION OF SOFTWARE IMPLEMENTATIONS

CROSS-REFERENCE TO RELATED APPLICATION

The present application is a divisional of U.S. patent application Ser. No. 09/158,022, filed Sep. 21, 1998, now U.S. Pat. No. 6,523,166.

FIELD OF THE INVENTION

The invention relates generally to computer systems and networks, and more particularly to an improved method and system for installing software implementations such as applications and components to users and computers in a network.

BACKGROUND OF THE INVENTION

In contemporary enterprises such as a corporation, one of the duties of a network administrator is to set up and maintain the corporation's computers so as to make employees more productive. Lost productivity at employees' computer desktops is a major cost for corporations, often resulting from user errors such as inadvertently removing some or all of a needed application or using an old application rather than an enterprise-specified one that is improved, secure and/or compatible with others. Similarly, lost productivity often results from user errors such as removing or modifying other software implementations such as system configuration files, dynamic link libraries (DLLs), application files and object classes (e.g., COM objects) in ways that render the computer or applications unworkable. Productivity is also lost when a desktop is too complex, such as when the desktop has too many non-essential applications and offerings thereon. At the same time, much of the expense of administering distributed personal computer networks is spent at the desktop, performing tasks such as fixing the settings or reinstalling implementations that the user has incorrectly or inadvertently modified.

At the same time, an enterprise wants certain personnel to have access to various software implementations such as applications, while wanting other applications to be available to certain users for access if needed. For example, a corporate enterprise may declare a policy specifying that everyone in the company should use a particular electronic mail program, while in addition, those in the research department should be able to load a particular spreadsheet application if needed.

However, to implement such policy decisions, administrators or the like generally need to physically visit each workstation to load (or unload) the specified programs and other software implementations, adjust various system configurations, and so forth. In addition to initially setting the computers, the administrators must hope (or regularly check) that the users do not change the settings, however users regularly make modifications, leading to lost productivity. The administrator also needs to revisit the workstations to install new versions of implementations.

Moreover, such policies cause problems when multiple users share the same computer, since a policy instituted for one user of that computer may not be compatible with the policy for another. As can be readily appreciated, installing software implementations in an enterprise is a complex task that does not fit in well with existing systems and methods.

SUMMARY OF THE INVENTION

Briefly, the present invention provides a system and method for automatically installing a software implementation on demand. When the operating system receives the request corresponding to a software implementation, the system and method determine from the information whether the software implementation is locally installed on the computer system, and if not installed, install it from a network source, if available. For example, the information may correspond to an application or object identifier, whereby the method and mechanism access the system registry or other database to determine the install state thereof. If the information indicates that the software implementation is not locally installed on the computer system, the method and mechanism install it from a source, such as a centralized network source. The registry or database may then be modified to indicate that the software implementation is installed. Path information or the like of the software implementation is then returned, such as to an operating system or application.

Software implementations include applications, file extension or application category information, an object class identified by a ClassID (GUID), application feature, or component. Software implementations may be automatically applied (assigned or published) to a policy recipient, such as a user at logon, and installed on an as-needed basis. A resulting feature of the present invention is that an administrator may assign or publish implementations in a single, central location.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
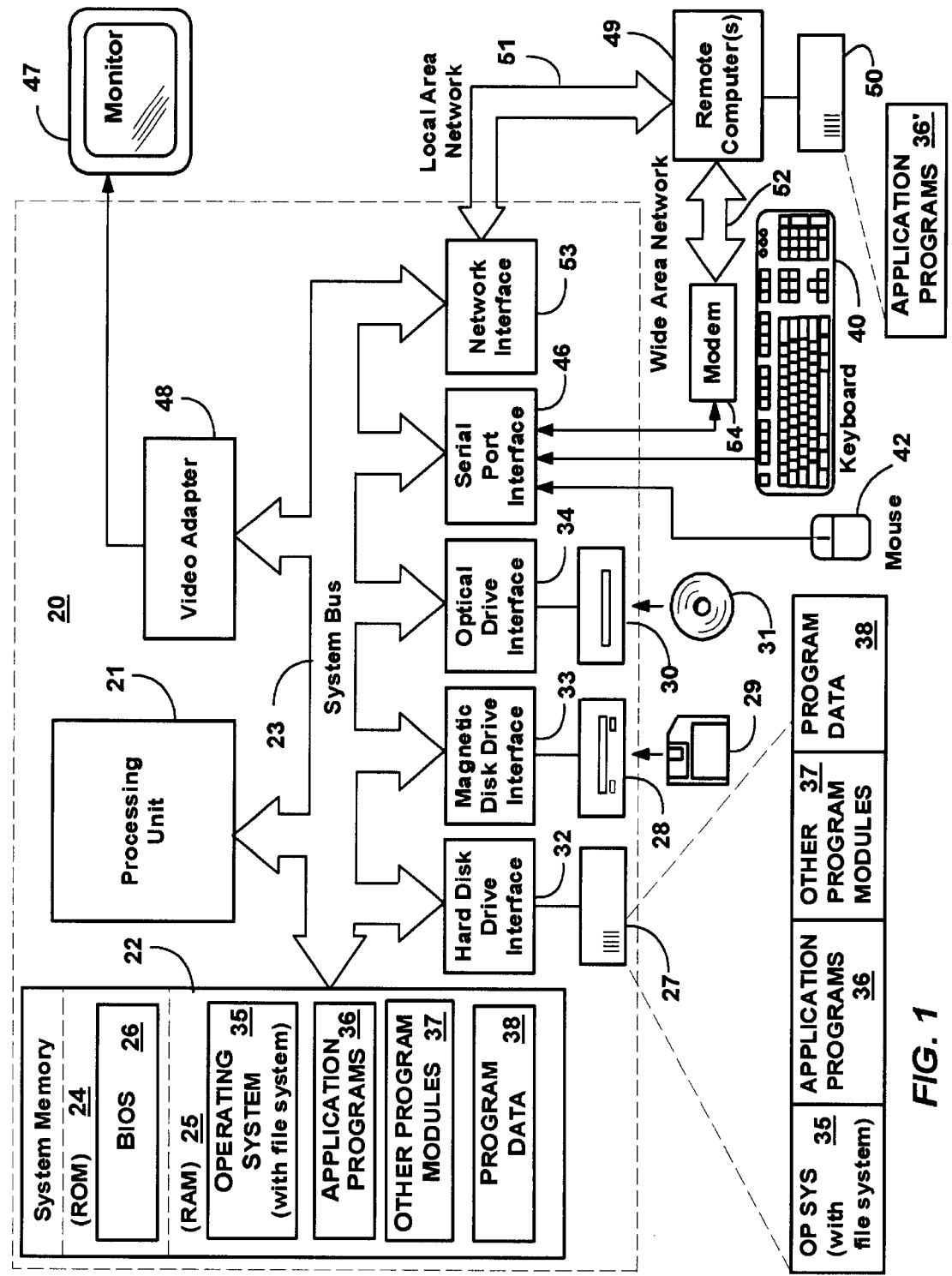
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

For purposes of the following description, a client workstation (e.g., $20_1$) may correspond to the computer system 20, while software implementations 60 such as applications or pieces thereof, (e.g., products, features and components as described below), objects and so on may reside on one or more of the remote computers 49. However as can be readily appreciated, no particular arrangement of the various files, interfaces, objects (classes), mechanisms, processes and so on described herein is necessary to the present invention. Indeed, as is understood in computing and networking in general, such files, interfaces, objects, mechanisms, processes and so on may be combined, separated and/or distributed in virtually any number of ways among the various network devices.

Figure 2:
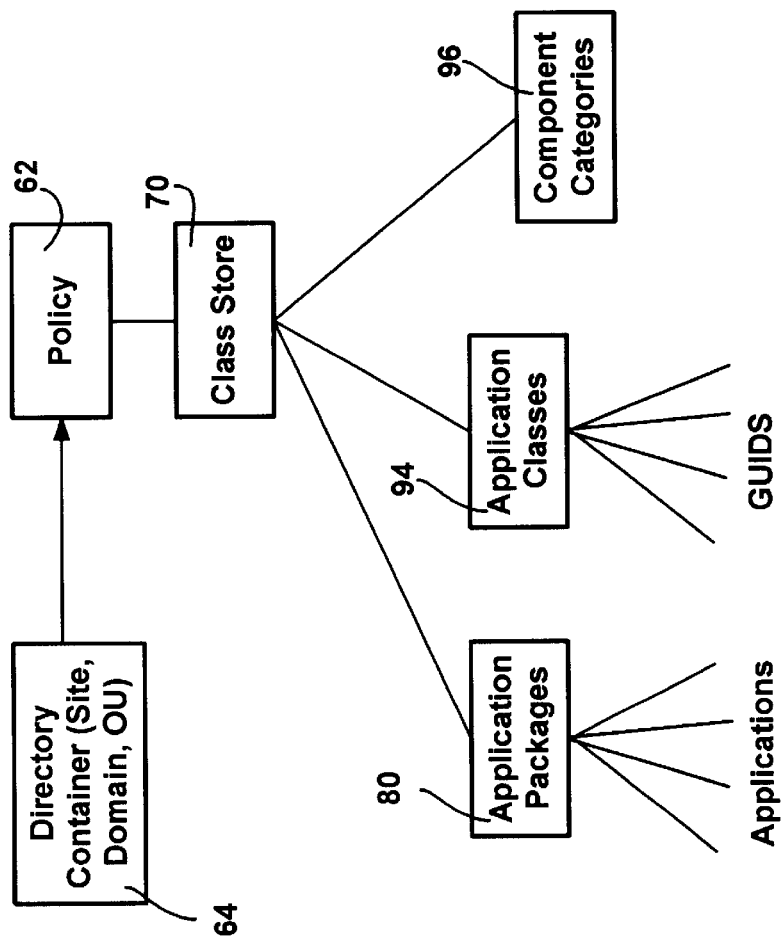
FIG. 2 is a diagram representing how various containers including a class store container are hierarchically organized under a policy object associated with a directory container.

In general, the present invention provides a method and system for automatically installing software implementations throughout a computer network in a highly flexible, scalable, extensible and efficient manner. To this end, as shown in FIG. 2, the method and system leverage a highly flexible architecture wherein an administrator can tailor policies 62 to containers 64 (sites, domains, and organizational units of users and computers arranged in a hierarchical manner), by specifying one or more policies 62 therefor, such that the policy within an organization is centrally managed. Such group policy objects 62, including the prioritizing of multiple policies for policy recipients (e.g., users or machines) are described in U.S. patent application Ser. No. 09/134,805, entitled "System and Method for Implementing Group Policy," assigned to the assignee of the present invention and hereby incorporated by reference herein in its entirety.

Figure 3:
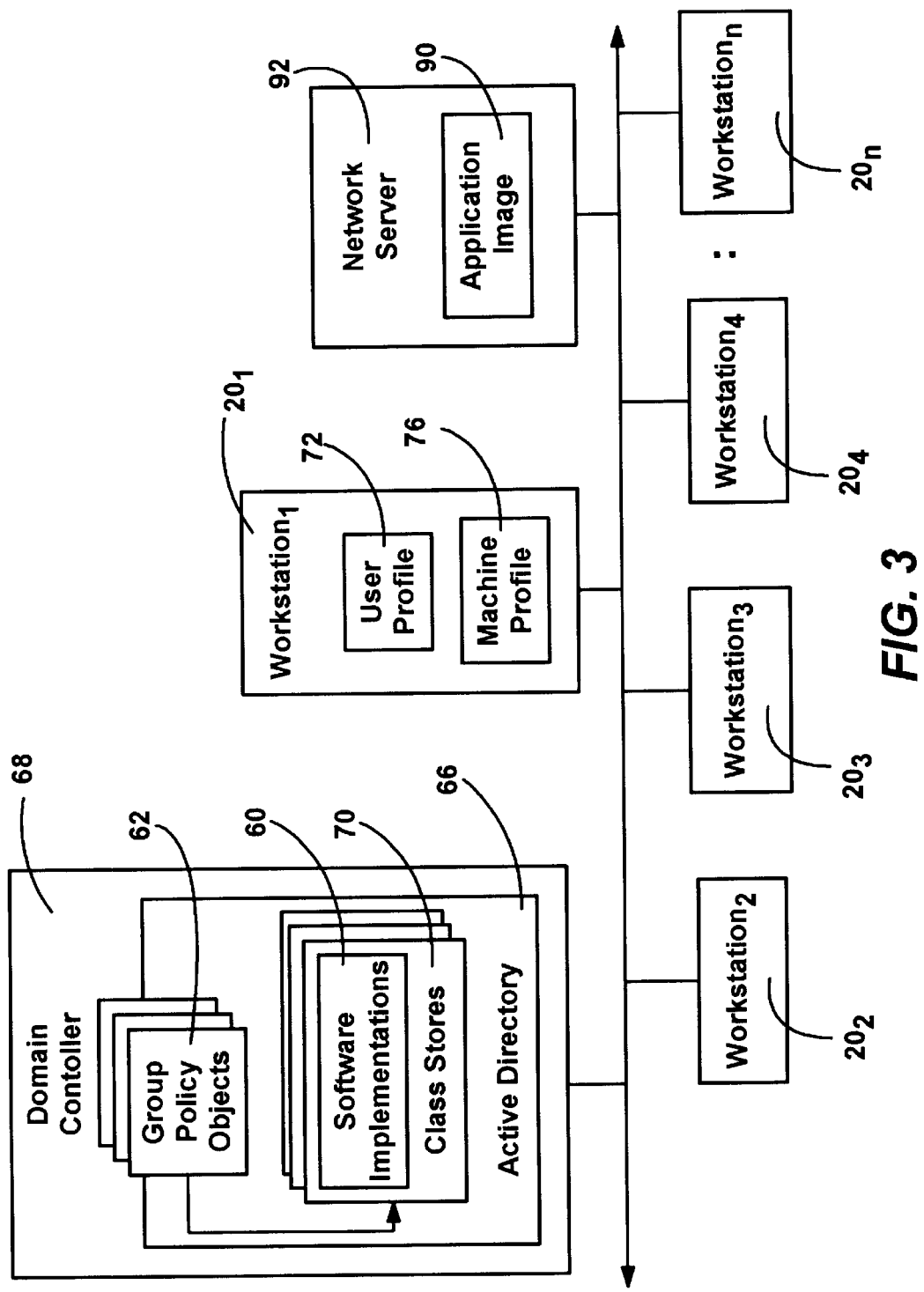
FIG. 3 is a block diagram generally representing a computer network into which the present invention may be incorporated.
Figure 4:
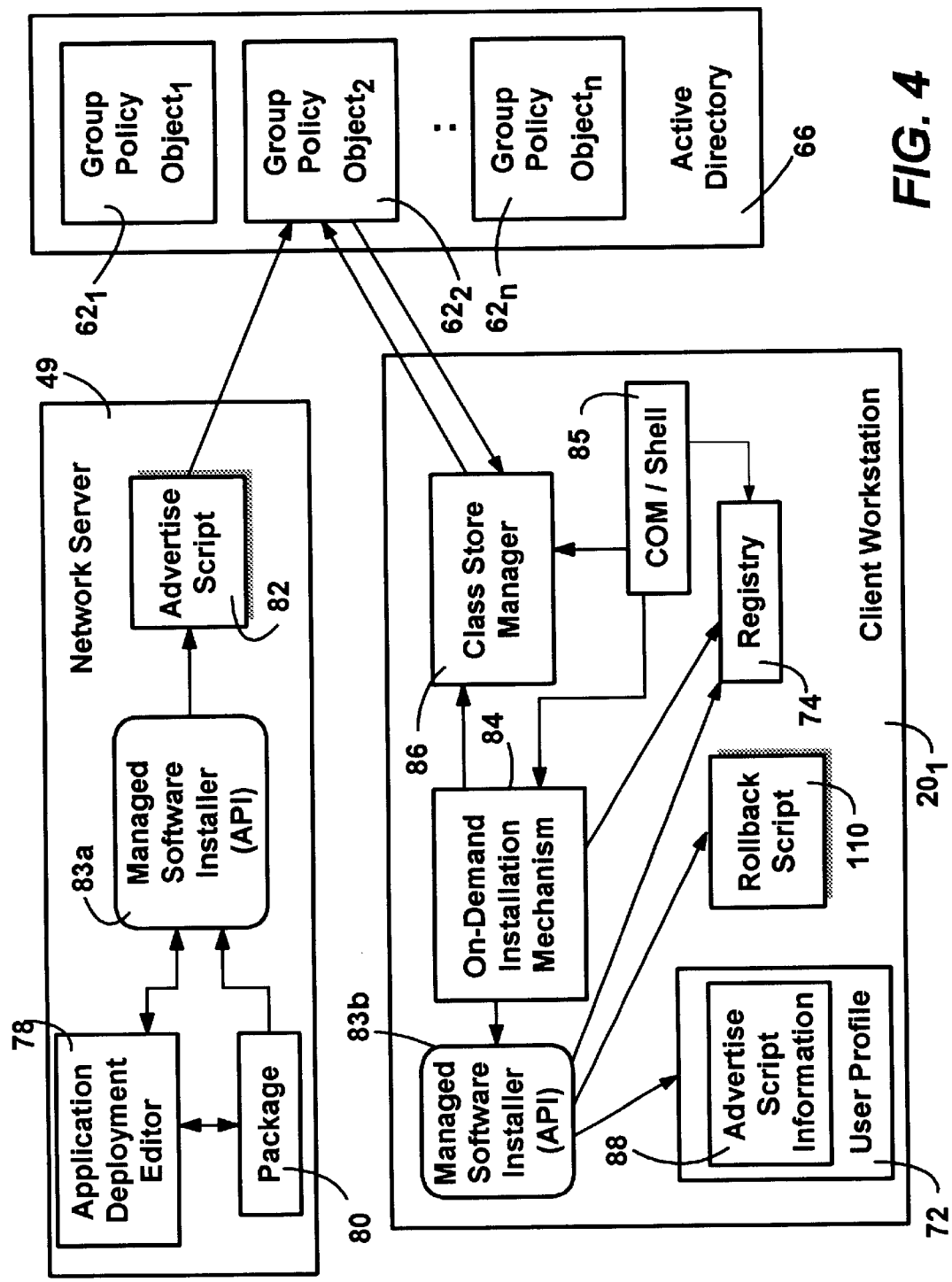
FIG. 4 is a block diagram generally representing exemplary components for possible on-demand installation thereof in accordance with various aspects of the present invention.

Although not necessary to the present invention, group policies 62 are maintained via a Windows NT® 5.0 directory service, known as the Active Directory 66, ordinarily maintained in a domain controller 68 (FIG. 3). More particularly, each group policy object 62 (FIG. 3) comprises a group policy container in the directory service and a group policy template in the "sysvol" of the domain controller 68, but for purposes of simplicity are generically referred to herein as a group policy object. In general, the Active Directory 66 stores information about the objects of a domain, and makes this information easy for administrators to access, find and apply via a single, consistent and open set of interfaces. For example, with the Active Directory 66, administrators have a single point of administration for the objects on the network, which can be viewed in a hierarchical structure. A core unit in the Active Directory 66 is the domain, and the objects of a network exist within a domain. A single domain can span multiple physical locations or sites.

Thus, the present invention is described herein with reference to the Microsoft® Windows NT® operating system, and in particular to the flexible hierarchical structure of sites, domains and/or organizational units of a Windows NT® Active Directory 66. Notwithstanding, there is no intention to limit the present invention to Windows NT® and/or the Active Directory architecture, but on the contrary, the present invention is intended to operate with and provide benefits with any operating system, architecture and/or mechanisms that install software implementations.

On Demand Installation of Software Implementations

In general, a first aspect of the present invention involves the on-demand installation of applications for purposes of application deployment, i.e., initially making an application or some piece thereof available (e.g., core code) to network policy recipients via policies 62. As described in the copending United States patent applications entitled "Method and System for Assigning and Publishing Applications" and "Method and System for Advertising Applications," assigned to the assignee of the present invention, filed concurrently herewith, and hereby incorporated by reference herein in their entireties, to initially deploy an application, an administrator can choose to either "assign" or "publish" the application. To this end, as shown in FIGS. 2 and 3, one or more group policy objects (templates) 62 may be associated with policy recipients, and a subcontainer of each group policy object, deemed a class store, may include application deployment information. Note that although separately shown in FIG. 3 for purposes of simplicity, a class store 70 is actually a subcontainer of the group policy container, as described in more detail in co-pending United States Patent Application entitled "Class Store Schema," assigned to the same assignee as the present invention, filed concurrently herewith and hereby incorporated by reference herein in its entirety.

Via this centrally maintained deployment information in the class store 70, policy recipients (e.g., users and workstations/machines) in a directory container 64 (e.g., organizational unit) are assigned applications, or applications are published thereto. An application typically is assigned to a group of users (or a group of machines) when it is deemed mandatory for that group to have that application, while published applications are those that are made optionally available to users who may benefit therefrom. For example, the same version of an electronic mail application program may be assigned to everyone in an organization, while a word processing program may be assigned to every group of users that needs some word processing capabilities. However, an application program for editing images may not be needed by everyone, and thus such a program may be published so that those users who may need it will get it on an as-needed basis by means of on-demand installation, while others who do not need it will not have it occupy resources of their workstations. Publishing is generally described below.

The information for published applications is not found in the registry 74 by the operating system, whereby the operating system looks to the class stores 70 (subcontainers of the group policy objects) of the active directory 66 for the information. As described in more detail below, if found in a script in the class store 70, the script is applied and the (formerly) published application is now advertised, installed and launched by an on-demand installer 84.

Figure 7:
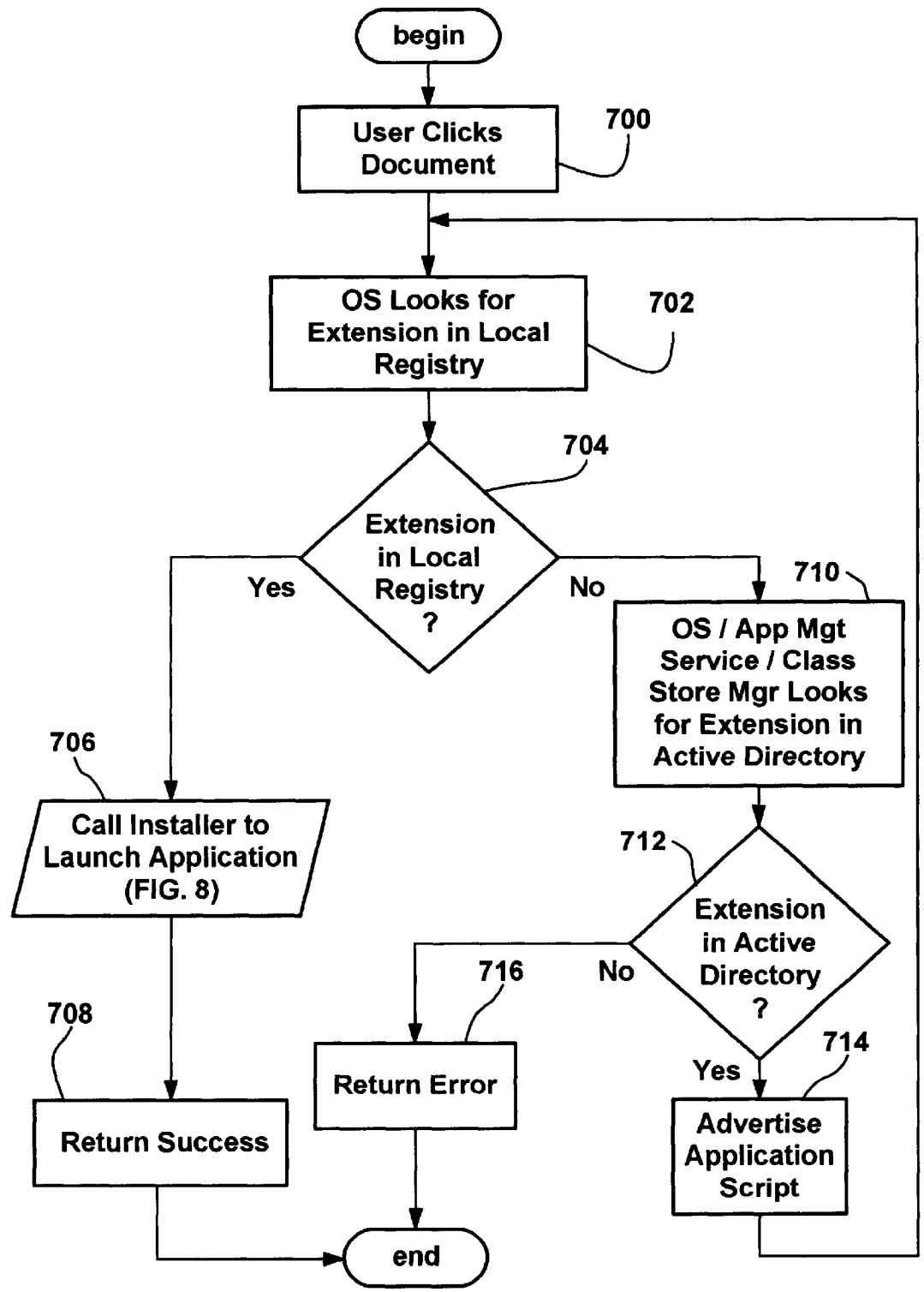
FIGS. 7 and 8 comprise a flow diagram generally representing the steps taken when a user attempts to activate an application via a file extension associated therewith.
Figure 8:
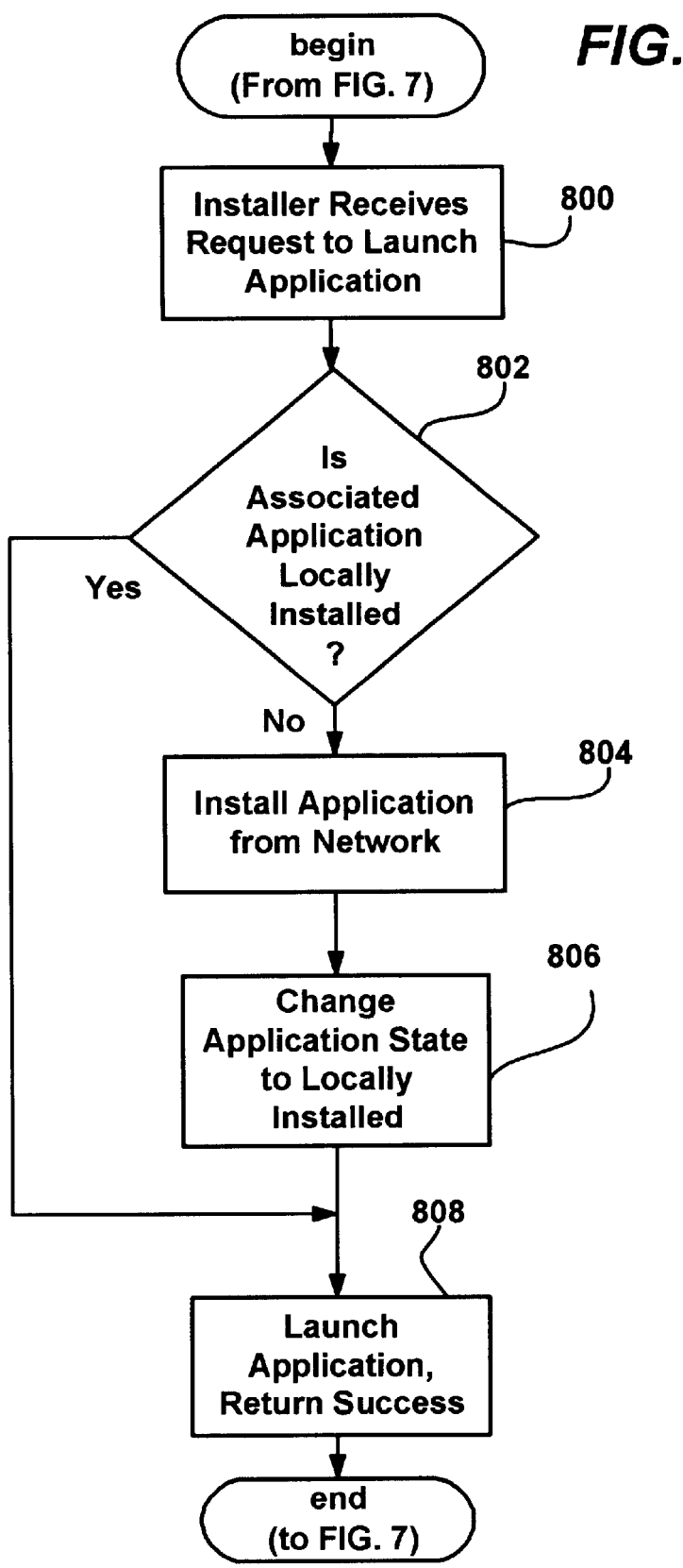

FIGS. 7 and 8 show how such an action leads to the file being executed, beginning at step 700 which represents the double-clicking (or similar operation such as right-click, open) of the document. At step 702, the operating system shell 85 looks to the local registry 74 for file extension information, i.e., an application associated with the file extension. If the information is found, step 704 branches to step 706 which then calls the installer 84 to launch the application (FIG. 8) as described below.

If not found in the local registry 74 at step 704, then an application corresponding to the extension has not been assigned, however an application corresponding to the extension may still be published to the requesting user. Published applications are just as manageable as assigned applications, however unlike assigned applications, a published application has no presence on a user's machine until invoked. Thus, a published application has no attributes on the client machine, but rather has its attributes stored in the Active Directory 66.

Note that a published application can be located in the Active Directory in a number of ways, including via an application name, a class ID serviced by the application, a program ID serviced by the application, a file extension serviced by the application, an interface identifier serviced by the application and MIME type or content type serviced by the application. To this end, each of the above attributes may be used as the key to locate a published application in the Active Directory 66. Then, once a published application is located, the application's user-friendly (human readable) name is available, as well as enough information to assign the application to the user. Thus, until needed, a published application is not installed, nor does it appear to the user to be installed. For example, there are no shortcuts present to use for activating the application.

Thus, when a possibly-published application is invoked, step 704 branches to step 710 to look for the extension information in the Active Directory 66, i.e., the class stores 70 associated with this user. To determine this, at step 710, the operating system calls an application management service 84 (i.e., the installer) to find the appropriate application for a particular file association or object class. To this end, a class store manager 86 is called by the application management service 84 to query the class stores 70 for an appropriate application as described in the aforementioned "Class Store Schema" patent application. This is alternatively shown by circled numerals one and two in FIG. 6. Note that the administrator may prioritize which application handles which extension since multiple applications may be capable of handling the same file type. If found, the application script is advertised at step 714 as described above, i.e., the application is effectively assigned to the user, the registry is populated, the item added to the Start Menu, and so on as if the application was assigned. The process then returns to step 702 so that the application may be launched. Conversely, if no associated application is found in the class stores 70 at step 712, an appropriate error is returned (e.g., no association for this application for this user) at step 716.

Note that if the directory lookup is successful, the return information is used to assign the application to the user's profile. As a result, the user may be given a roaming profile, whereby such information roams with the user regardless of where the user logon takes place. If not, the information stays on the machine that triggered the assignment. In this manner, published applications as well as assigned applications essentially follow the user around. Once the application is assigned, activation continues as with normal assigned applications.

Certain applications may be packaged into features and components in accordance with the managed software (MSI) format. To manage these MSI applications, the managed software installer mechanism 83b uses the identifiers set forth in the following table:

| | |
|---|---|
| {ProductCode} | A standard GUID which uniquely identifies a product. |
| FeatureID | A string which represents a feature. A FeatureID should be human readable and need only be unique within a given product. |
| {ComponentCode} | A standard GUID which uniquely identifies a component. |
| [Descriptor] | A descriptor is comprised of a {ProductCode}, a FeatureID and a {ComponentCode} within square brackets, e.g., [{ProductCode}FeatureIDdelimiter{ComponentCode}]. A delimiter exists between the FeatureID and the {ComponentCode} since a FeatureID is variable in length. |
| Delimiter | ASCII value 2, chosen so as to not collude with characters that might appear as part of a FeatureID |

The per-user configuration manager information is stored below the registry key HKEY_CURRENT_USER\Software\Classes\Installer. General properties for each advertised product are stored under a Products key by {ProductCode}. When the on-demand installer mechanism 84 detects such an application (via an MSI code) in the registry 74 or the class store 70, the installer 84 calls the managed software installer mechanism 83b (comprising an MSI install engine/service 100, 104 as described below with reference to FIG. 10). MSI is a preferred way to package applications. The managed software installer mechanism 83b is described in more detail in the United States Patent application entitled "Software Implementation Installer Mechanism," hereby incorporated by reference herein in its entirety.

Figure 6:
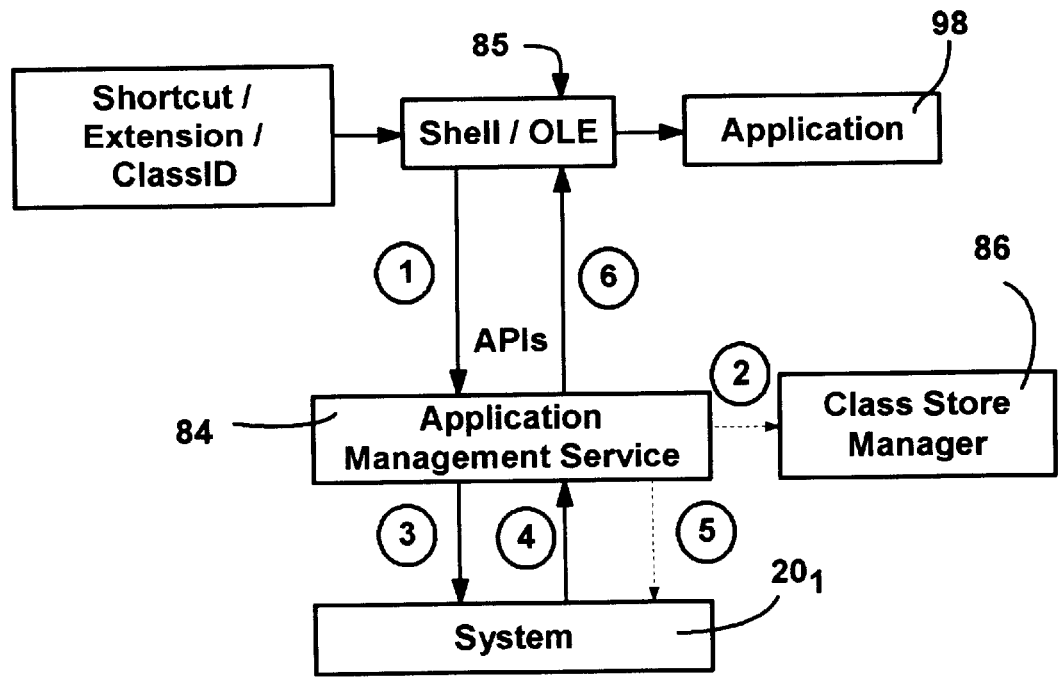
FIG. 6 is a block diagram generally representing the on-demand finding and installation mechanism handling on-demand installation in response to a request by the operating system or OLE in accordance with one aspect of the present invention.

An association between the on-demand installer mechanism 84 and the operating system shell/OLE 85 enables on-demand installation of software implementations. For example, as represented in FIG. 6, shell and OLE activation code (collectively 85), as well as many shell and OLE-related registry entries, are preferably installer mechanism-aware.

To launch an application, managed shortcuts include a descriptor (based on a shortcut, classID, file extension and so on) that the shell activation code 85 detects, and hands to the installer 84, to await resolution in the form of a path, which it may then process. Similarly, OLE activation is aware of such descriptors, and calls the installer mechanism 84 to resolve them. As described above, MSI packages are handled by calling the managed software installer mechanism 83b to locate the application and return a path thereto.

Figure 5:
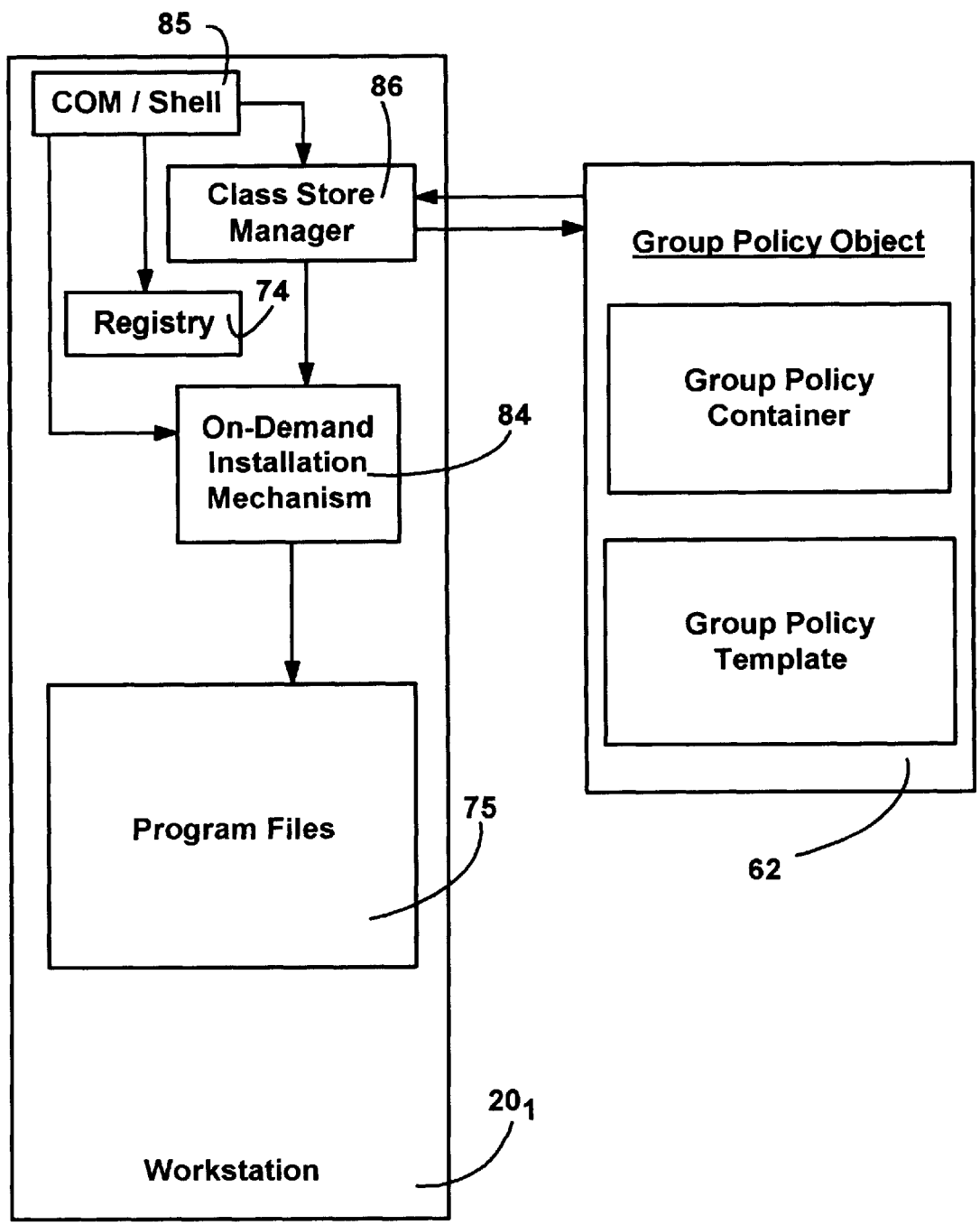
FIG. 5 is a block diagram generally representing the processing of on-demand location and installation of applications for policy recipients.

FIG. 8 shows the steps taken by the installer 84 to launch the application. When the installer 84 receives the extension information, (step 800), the installer mechanism 84 determines if the application is locally installed at step 802, one of the possible states of an advertised application. As represented by the circled numeral three in FIG. 6, the on-demand installer mechanism 84 looks to the system (i.e., the registry or similar database) to determine if the state is locally installed, and receives this state information as represented by the circled numeral four. If the application is not locally installed, the installer 84 installs it, (e.g., into a program files folder 75, FIG. 5, of the file system), as shown by circled numeral five and at step 804, (or at least some core portion of the application), as also described in the aforementioned copending United States Patent Application entitled "Software Implementation Installer Mechanism." Also, at step 806, the state of the application is changed to installed, so that the next time activation thereof is requested, installation is not necessary. Lastly, at step 808, the installer 84 launches the application. Regardless of whether previously installed or not, and assuming no other errors, security problems and so forth, success is returned at step 708 (FIG. 7, and circled numeral six, FIG. 6), and the application appropriately opens the document. Note that except for possible installation delay times, in typical situations, the installation is essentially invisible to the user.

Note that many file extensions are capable of being handled by multiple applications. The administrator or user may prioritize which applications open which files. To this end, each application sets forth the file extensions it is capable of handling, and this information is stored in the Active Directory 66. When a file extension is selected, a suitable mechanism may be employed to scan the application information in the Active Directory to locate those applications that handle that file type. Via a suitable user interface, the administrator may then determine which application association gets written into the registry for that file type, and also may rank the order of searching for a suitable application in the class store 70 to open the file in the event that the association is not found in the registry.

In addition to installing applications, the On-Demand Installation mechanism 84 may install other software implementations such as an application's object classes 94 (FIG. 2). To this end, the class store 70 maintains the classes 94 (or the information needed to locate the classes on the network). When the operating system shell/OLE 85 or the like receives a request for an object class, it first checks the local registry 74 or other database to determine if the object class is locally installed. If not found locally, it looks for the object class ClassId (GUID) in the class store 70. If found, the Class Store provides the file path for the installation script and the installer mechanism 84 installs the object class therefrom. If there is no appropriate application published in the Class Store to handle this ClassID, the operating system/OLE 85 return an error.

The On-Demand mechanism 84 may also provide information about software implementations based on component categories 96. For example, a category to which an application belongs effectively may be "spreadsheet." If the On-Demand mechanism 84 receives a category request for a spreadsheet application, the mechanism 84 may look up the Class Store for component categories 96, also maintained in the class store 70, to determine if a spreadsheet application is published to the user, and if so, return the ClassID details of that component.

In general, the on-demand mechanism 84 provides a standard global lookup mechanism for finding applications and components in the context of the group policy. As described in more detail below, the on-demand installer mechanism 84 also exposes an application programming interface (API) which an application program 98 may use (FIG. 9) to determine what installation choices users made, or even to install missing components. For example, if a component is missing, the application 98 itself may in effect run setup for the user, using installer APIs as set forth below to install the missing component. In conjunction with the managed software installer mechanism 83b, this may provide administrators in managed environments with a powerful set of tools for determining the software installed, and remotely pushing software installation down to user machines.

Finding an Appropriate Application or Component

When an on-demand request is received from the shell or OLE 85, the lookup mechanism performs a query on the Active Directory 66 to locate all eligible applications or components that meet the requirement and then find the most suitable package for installation. Many rules are applied during this selection process, as detailed below.

Locale and Language: The mechanism ensures that the locale and language of the application package (as captured in a DWORD known as LCID in Windows NT) matches the default locale of the requesting user OR the default locale of the requesting machine OR the default locale as specified by the domain administrator in the above order of precedence. The mechanism attaches weights to the type of locale match and uses this as a tiebreaker, if required, to select a winner.

Architecture: The mechanism ensures that the selected package must be compatible with the target machine's processor architecture and operating system.

File Extension: If there are multiple packages in a class store 70 under a group policy, all of which handle files of a particular file extension, the on-demand mechanism 84 takes the priority number associated with each file extension to attach weights to the packages. File extension priority takes precedence over locale preference.

CLSID and Class context—When the request is for a specific object ClassId (GUID) the On-Demand mechanism finds all packages that implement the ClassId. If multiple packages implement a ClassId, the COM Execution Context of the application is used to define the order of preference. An Inproc implementation has higher weight than local server implementation.

Upgrades—If there are upgrade relationships among two applications that match the selection criteria, then the relationship itself is used to make the choice. Thus, if two packages that qualify are related with a upgraded-by relationship, the one that upgrades takes precedence. This is processed at the outset and overrides all other weights.

Accordingly, the selection process goes by:
Discard based on upgrade relationships;
Discard based on file ext priority;
Discard based on architecture order;
Discard based on locale weights;
Discard based on Inproc/Local/Remote server precedence.

On-Demand Installation APIs

The following APIs are provided by the on-demand Installation mechanism.

CsGetAppInfo

STDAPI CsGetAppInfo (uCLSSPEC * pclsspec,
    QUERYCONTEXT * pQueryContext,
    PACKAGEDISPINFO * pPackageInfo);

This API is used to search for applications or COM component implementations that can satisfy activation request from COM (OLE)/Shell 85. This supports on-demand install by finding if a deployed application would be able to satisfy the CLSID, file extension or ProgID based activation. The on-demand installation of software implementations including applications is described in copending United States Patent Applications entitled "Class Store Schema" and "Software Implementation Installer Mechanism," assigned to the same assignee as the present invention, filed concurrently herewith and hereby incorporated herein by reference in their entireties.

Note that the user's policy is used, i.e., the search is applied to the class stores in the user's policy from bottom to top order, whereby the lowest organizational unit with application policy takes precedence.

This API is used by COM object activation when an implementation is not found in the local machine, as described below. The API is also used by a Shell application launch when a file extension-based activation does not find an application for a file extension in the local registry. Note that this API is equivalent to calling CsGetClassAccess to get an IClassAccess pointer and then calling GetAppInfo method.

CsGetClassAccess

STDAPI CsGetClassAccess(IClassAccess ** ppIClassAccess);

This API returns a IClassAccess interface pointer for the application policy. The interface pointer may be used to invoke methods to query into or enumerate applications that are deployed. Depending upon whether this is called under User credentials OR LOCAL SYSTEM credentials either the user or the machine policy is used.

Interface IClassAccess

IClassAccess::GetAppInfo

```
HRESULT GetAppInfo (
    [in]    uCLSSPEC          *pClassSpec,
    [in]    QUERYCONTEXT      *pQryContext,
    [out]   PACKAGEDISPINFO   *pInstallInfo
    );
typedef union switch(DWORD tyspec)
{
    case TYSPEC_CLSID:
        CLSID clsid;
    case TYSPEC_IID:
        IID iid;
    case TYSPEC_TYPELIB:
        GUID typelibID;
    case TYSPEC_FILEEXT:
        LPOLESTR pFileExt;
    case TYSPEC_MIMETYPE:
        LPOLESTR pMimeType;
    case TYSPEC_PROGID:
        LPOLESTR pProgId;
    case TYSPEC_FILENAME:
        LPOLESTR pFileName;
    case TYSPEC_JAVACLASS:
        LPOLESTR pJavaClassName;
    case TYSPEC_PACKAGENAME:
        struct {
            LPOLESTR pPackageName;
            GUID GpoId;
        } ByName;
    case TYSPEC_SCRIPTNAME:
        struct {
            LPOLESTR pScriptName;
            GUID GpoId;
        } ByScript;
} uCLSSPEC;
```

This method is used to search for applications or COM component implementations that can satisfy activation requests from COM (OLE)/Shell 85, thereby supporting on-demand install by finding if a deployed application would be able to satisfy the CLSID, File Extension or ProgID based activation. Note that the user's policy is used, i.e., the search is applied to the class stores in the user's policy from bottom to top order, whereby the lowest Organizational Unit with application policy takes precedence.

IClassAccess::EnumPackages

```
HRESULT   EnumPackages (
          [in, unique]    LPOLESTR     pszPackageName,
          [in, unique]    GUID         *pCategory,
          [in, unique]    ULONGLONG    *pLastUsn,
          [in]            DWORD        dwAppFlaqs,
          [out]           IEnumPackage **ppIEnumPackage
          );
```

This method returns an Enumerator interface that allows accessing the list of application packages deployed to an user.

Interface IEnumPackage

```
typedef struct tagPACKAGEDISPINFO
{
      LPOLESTR       pszPackageName;
      DWORD          dwActFlags;
      CLASSPATHTYPE  PathType;
      LPOLESTR       pszScriptPath;
      LPOLESTR       pszPublisher;
      LPOLESTR       pszUrl;
      UINT           installUiLevel;
      ULONG          cScriptLen;
      ULONGLONG      Usn;
      DWORD          dwVersionHi;
      DWORD          dwVersionLo;
      DWORD          dwRevision;
      GUID           ProductCode;
      GUID           *pClsid;
      GUID           GpoId;
      LPOLESTR       pszPolicyName;
      UINT           cUpgrades
      [size_is(cUpgrades)]LPOLESTR *prgUpgradeScript;
      [size_is(cUpgrades)]DWORD    *prgUpgradeFlag;
} PACKAGEDISPINFO;
interface IEnumPackage : IUnknown
{
      HRESULT Next(
         [in] ULONG celt,
         [out, size_is(celt), length_is(*pceltFetched)]
            PACKAGEDISPINFO *rgelt,
         [out] ULONG *pceltFetched
         );
      HRESULT Skip(
         [in] ULONG celt);
      HRESULT Reset( );
      HRESULT Clone(
         [out] IEnumPackage **ppenum);
}
```

The methods are standard IEnumXXX methods and have similar semantics. Next( ) allows enumeration of the next celt number of packages, Skip( ) lets the caller skip celt number of packages during enumeration, Reset( ) sets the starting point back to the first package in the set and Clone( ) creates an identical enumerator instance.

Figure 10:
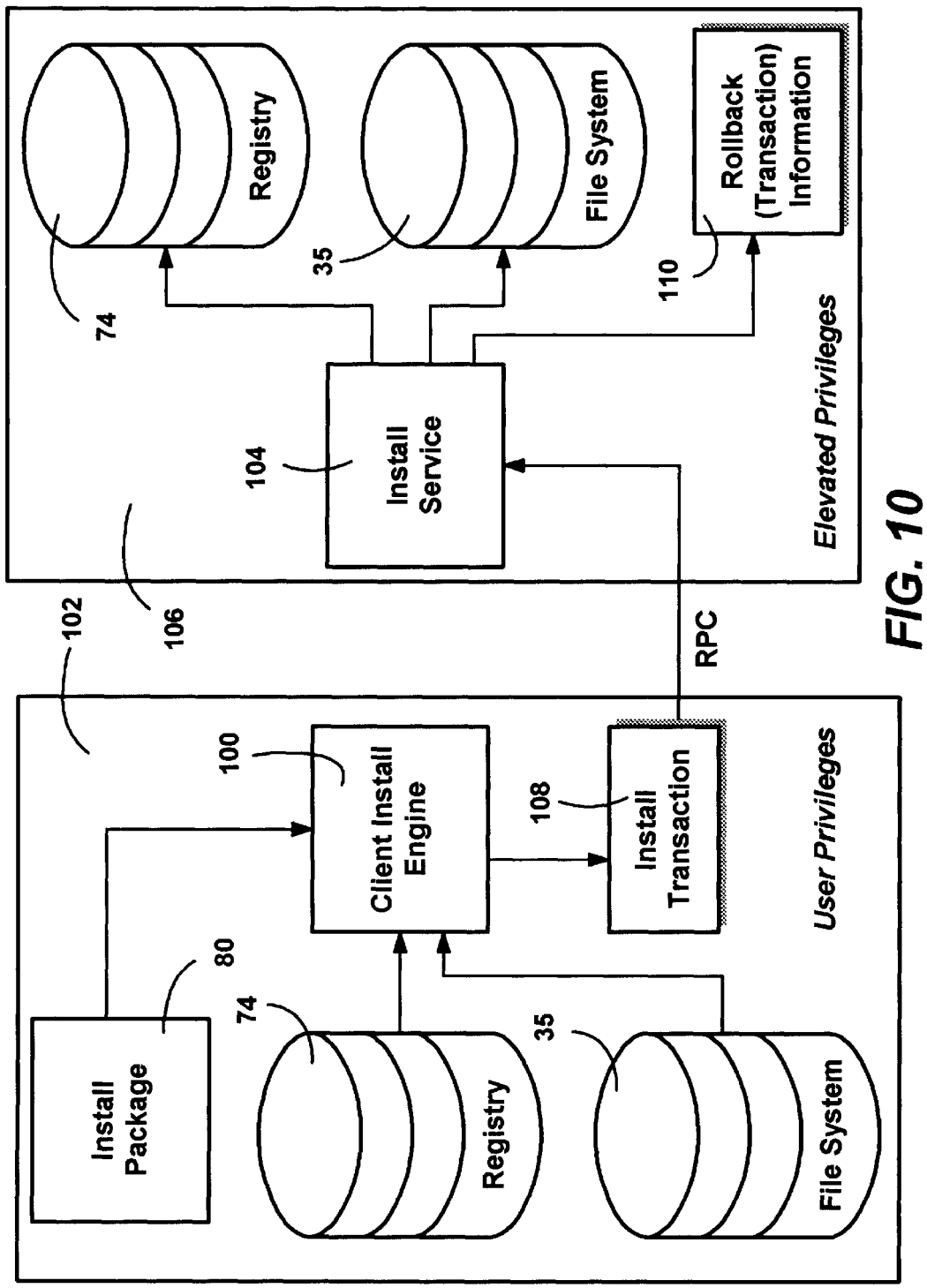
FIG. 10 is a block diagram generally illustrating components for installing software implementations in accordance with various aspects of the present invention.

For each package the following information is returned:

PszPackageName: Deployment name of Package.
DwActFlags: Deployment state.
PathType: Package Type.
PszScriptPath: Script Path for Package
CscriptLen: Size of the Script for the Package
PszPublisher: Name of Package Publisher.
PszUrl: URL where more info is available.
InstallUiLevel: UI Level for installation.
Usn: Deployment name of Package
DwVersionHi: Package Major Version Number
DwVersionLo: Package Minor Version Number
DwRevision: Package Revision Number
ProductCode: MSI Product Code
Pclsid: If a COM component, one CLSID the package implements.
GpoId: Policy GUID of the group policy package is deployed
PszPolicyName: Policy Name of the group policy package is Deployed
Cupgrades: Number of Upgrade relationships
PrgUpgradeScript: Script that has upgrade relationship
PrgUpgradeFlag: Type of upgrade relationship
    Upgrade
    Upgrades w/Uninstall
    UpgradedBy Managed Software Installer The On-Demand installation mechanism 84 also leverages the Managed Software Installer (MSI) mechanism 83b for the installation. FIG. 10 illustrates the managed software installer mechanism 83b architecture as embodied in the Windows NT® operating system, wherein the installer consists of two executable components, a client install engine 100, which runs with user privileges 102, and an install service 104. Because the install service 96 is implemented as an NT Service, it may be run with elevated administrative privileges 106. Note that changes to the system configuration (e.g., changes to the registry 74 and file system 35) are done as an installation transaction 108 by the install service 104, and the rollback transactions 110 are logged to provide for rollback of a failed or aborted installation. The rollback includes restoring the original contents of files replaced or deleted during the installation and restoring overwritten or deleted registry settings (e.g., COM class registration). Note that since this rollback information 110 may take up a significant amount of space, it may be disabled by an administrator or a user when performing an installation. The client install engine 100 and the install service 104 communicate through secure remote procedure calls. Note that remote procedure calls on not used when everything is in the same process, such as with Windows 98.

Although not necessary to the present invention, to improve installation, the installer 83b is arranged to divide applications into a three-level hierarchy, such as described in the aforementioned "Software Implementation Installer Mechanism" patent application. At the top of the hierarchy is a product, which is an implementation that an administrator or end-user may install, e.g., a specific word processing application package such as Microsoft® Word. A product may be composed of multiple features, wherein a feature is the smallest installable unit of functionality. Examples of features of a word processor are a reader, editor, and spellchecker. A feature is something an administrator/user may choose to install or not, and thus somewhat corresponds to a checkbox in the "Custom" or "Advanced" installation dialog of a conventional installation mechanism.

Features in turn comprise one or more components, wherein a component is the smallest unit of sharing among products and features. For example, a component may be shared by both the Reader feature and the Editor feature. While features are specific to a product and identified by a name unique only within the product (e.g. "Reader"), components are global across all products installed on a machine and are identified by a GUID. Note that although COM components are also uniquely identified by a GUID and may be encapsulated as an installer component, an installer component is not related to COM.

Figure 9:
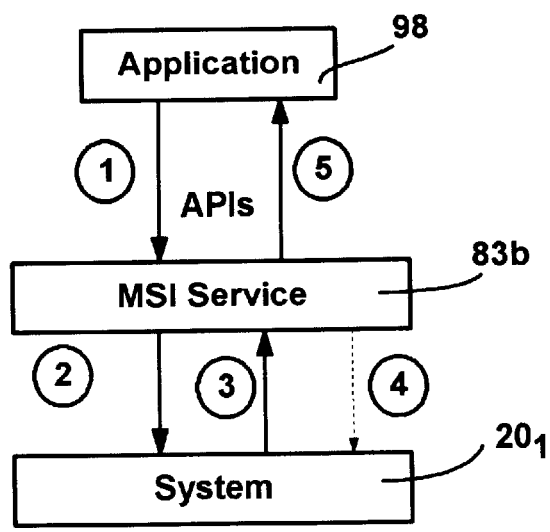
FIG. 9 is a block diagram generally representing the installer mechanism handling on-demand installation in response to a request by an application in accordance with another aspect of the present invention.

Since as shown in FIG. 9, applications may use the installer 83b, applications may repair themselves such as by installing missing or damaged components or files. Applications may avoid errors by checking with the installer 83b before making assumptions about what is installed on a machine at a given time. Missing features and components will be automatically installed by the installer mechanism whenever possible (and if allowed).

As can be seen from the foregoing detailed description, there is provided a method and system for automatically installing software implementations across a network in accordance with a policy. The operating system or COM first looks to see if the implementation is locally advertised, and if not, looks to a centralized class store for the implementation information. The shell/COM then asks an installer to launch the implementation, which first determines if the implementation is locally installed. If not installed, the installer automatically installs the implementation from the network.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a network of computer systems, a system for deploying software implementations to policy recipients, comprising, a centralized store of policy objects, at least one of the policy objects having an advertise script associated therewith, the advertise script including software implementation information of at least one software implementation for assigning to policy recipients, a first mechanism that applies policy objects to a policy recipient, wherein at least one of the policy objects applied to that recipient has the advertise script associated therewith, the first mechanism processing the script to advertise at least one software implementation to the policy recipient, a second mechanism that requests activation of a selected software implementation, and an installer for determining whether the selected software implementation is locally installed on the computer system, the installer automatically installing the selected software implementation if the selected software implementation is not locally installed on the computer system.

2. The system of claim 1 wherein the second mechanism comprises at least one component of an operating system and the selected software implementation comprises an application program.

3. The system of claim 1 wherein the second mechanism comprises a COM object.

4. The system of claim 1 wherein the selected software implementation comprises an object class.

5. The system of claim 1 wherein the selected software implementation corresponds to an executable program that is advertised as available to the policy recipient but is not locally installed on the computer system, the installer automatically installing the executable program when the second mechanism requests activation thereof.

6. The system of claim 5 wherein the installer automatically installs as least one component associated with the executable program when the second mechanism requests activation thereof.

7. The system of claim 5 wherein following the automatic installation of the executable program, path information of the executable program is returned to the second mechanism and the second mechanism executes the executable program based on the path information.

8. The system of claim 1 wherein the installer is capable of installing a plurality of different software implementations in response to the activation request, wherein only one software implementation is needed as the selected software implementation, and wherein the installer invokes a rule mechanism to determine which of the plurality of different software implementations to install as the selected software implementation.

9. The system of claim 8 wherein the rule mechanism determines the selected software implementation based on upgrade relationships among the plurality of different software implementations.

10. The system of claim 8 wherein the rule mechanism determines the selected software implementation based on a file extension priority among the plurality of different software implementations.

11. The system of claim 8 wherein the rule mechanism determines the selected software implementation based on an architecture.

12. The system of claim 8 wherein the rule mechanism determines the selected software implementation based on locale weights among the plurality of different software implementations.

13. The system of claim 8 wherein the rule mechanism determines the selected software implementation based on an in process, local and remote server precedence.

14. The system of claim 8 wherein the rule mechanism determines the selected software implementation by discarding other software implementations of the plurality in a discard order based on:
   1) upgrade relationships among the at least two corresponding software implementations;
   2) file extension priorities;
   3) architectures;
   4) locale weights; and
   5) in process, local and remote server precedence.

15. In a computing environment, a method comprising:
   advertising a software implementation as available for execution on a computer system, the advertising being independent of whether any version of the software implementation is actually installed on the computer system;
   receiving a request to activate the software implementation, the request including information that identifies the software implementation;
   in response to the request, determining whether any version of the selected software implementation is locally installed on the computer system; and
   if there is not any version of the selected software implementation locally installed on the computer system, automatically installing the selected software implementation based on the information that identifies the software implementation.

16. The method of claim 15 wherein advertising the software implementation comprises executing an advertise script.

17. The method of claim 15 wherein advertising the software implementation comprises executing a logon script.

18. The method of claim 15 wherein automatically installing the selected software implementation comprises loading the selected software implementation from a network source.

19. The method of claim 15 further comprising, returning a path indicating an installed location of the requested software implementation.

20. The method of claim 19 wherein an application program requests installation of the software implementation, and wherein the path is returned to the application program.

21. The method of claim 15 further comprising, determining at least two separate software implementations that can satisfy the request if installed, and accessing additional information to determine which of the at least two separate software implementations to install as the selected software implementation.

22. The method of claim 21 wherein the additional information corresponds to upgrade relationships among the at least two separate software implementations.

23. The method of claim 21 wherein the additional information corresponds to a file extension priority among the at least two separate software implementations.

24. The method of claim 21 wherein the additional information corresponds to an architecture.

25. The method of claim 21 wherein the additional information corresponds to locale weights among the at least two separate software implementations.

26. The method of claim 21 wherein the additional information corresponds to an in process, local and remote server precedence.

27. The method of claim 21 wherein the additional information corresponds to a discard order, including:
1) upgrade relationships among the at least two corresponding software implementations;
2) file extension priorities;
3) architectures;
4) locale weights; and
5) in process, local and remote server precedence.

28. A computer-readable medium having computer-executable instructions for performing the method of claim 15.

29. In a computing environment, a method comprising:
receiving policy data at a policy recipient corresponding to a computer system;
interpreting the policy data to advertise a software implementation as available for execution on a computer system prior to actual installation of that advertised software implementation;
determining in response to a request to activate the advertised software implementation that the software implementation is not locally installed on the computer system; and
automatically installing a software implementation corresponding to the advertised software implementation.

30. The method of claim 29 wherein the policy data is received via a group policy container associated with the policy recipient.

31. The method of claim 30 wherein interpreting the policy data comprises executing an advertise script associated with the group policy container.

32. The method of claim 30 wherein automatically installing the selected software implementation comprises accessing deployment information maintained in association with the group policy container.

33. The method of claim 30 wherein the deployment information provides a set of rules for determining which one of a plurality of software implementations associated with the advertised software implementation is to be installed in response to the request.

34. A computer-readable medium having computer-executable instructions for performing the method of claim 29.

* * * * *